United States Patent
Koo et al.

(10) Patent No.: US 9,173,174 B2
(45) Date of Patent: Oct. 27, 2015

(54) RESOURCE BLOCK INDICATION AND ALLOCATION FOR IN-DEVICE COEXISTENCE INTERFERENCE AVOIDANCE

(71) Applicant: BlackBerry Limited, Waterloo (CA)

(72) Inventors: Changhoi Koo, Plano, TX (US); Mohammed Nawaf Smadi, Ancaster (CA); Cristian Lambiri, Kanata (CA); Michael Hubo-Kleiss, Bochum (DE); Göran Hageltorn, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 259 days.

(21) Appl. No.: 13/842,805

(22) Filed: Mar. 15, 2013

(65) Prior Publication Data

US 2014/0071904 A1    Mar. 13, 2014

Related U.S. Application Data

(60) Provisional application No. 61/698,918, filed on Sep. 10, 2012.

(51) Int. Cl.
*H04W 4/00*    (2009.01)
*H04W 52/24*   (2009.01)

(52) U.S. Cl.
CPC .................... *H04W 52/243* (2013.01)

(58) Field of Classification Search
USPC ................................... 370/252, 329
See application file for complete search history.

(56) References Cited

U.S. PATENT DOCUMENTS

| | | | |
|---|---|---|---|
| 2010/0227614 A1 | 9/2010 | Chun et al. | |
| 2011/0081858 A1 | 4/2011 | Tolentino et al. | |
| 2012/0075989 A1* | 3/2012 | Roessel et al. | 370/230 |
| 2012/0176923 A1* | 7/2012 | Hsu et al. | 370/252 |
| 2012/0207040 A1* | 8/2012 | Comsa et al. | 370/252 |
| 2012/0257519 A1* | 10/2012 | Frank et al. | 370/252 |
| 2013/0114515 A1* | 5/2013 | Koo et al. | 370/329 |
| 2013/0114516 A1* | 5/2013 | Koo et al. | 370/329 |
| 2014/0071904 A1* | 3/2014 | Koo et al. | 370/329 |
| 2014/0141825 A1* | 5/2014 | Koo et al. | 455/501 |
| 2014/0334330 A1* | 11/2014 | Baghel et al. | 370/252 |

FOREIGN PATENT DOCUMENTS

WO    2012068934 A1    5/2012

OTHER PUBLICATIONS

PCT International Search Report; Application No. PCT/US2013/032610; Jun. 3, 2012; 2 pages.

(Continued)

*Primary Examiner* — Phuongchau Ba Nguyen
(74) *Attorney, Agent, or Firm* — Conley Rose, P.C.; J. Robert Brown, Jr.

(57) ABSTRACT

A method is provided for reducing radio frequency interference between a first device and a second device co-located on a UE. The method comprises transmitting, by the UE, to a network element, responsive to the UE detecting IDC interference between the first device and the second device, an output power level of the first device, an amount of de-sense experienced by the second device, and information regarding a plurality of RBs on which the UE requests to perform an uplink transmission.

17 Claims, 11 Drawing Sheets

(56) References Cited

OTHER PUBLICATIONS

PCT Written Opinion of the International Searching Authority; Application No. PCT/US2013/032610; Jun. 3, 2013; 5 pages.
Fodor, Gabor, et al.; "Architecture and Protocal Support for Radio Resource Management (RRM)"; Dec. 19, 2007; 51 pages.
ETSI TS 136 213 V8.8.0; LTE; Evolved Universal Terrestrial Radio Access (E-UTRA); Physical Layer Procedures; (3GPP TS 36.213 Version 8.8.0 Release 8); Oct. 2009; 79 pages.
3GPP TS 36.101 V11.3.0; 3rd Generation Partnership Project; Technical Specification Group Radio Access Network; Evolved Universal Terrestrial Radio Access (E-UTRA); User Equipment (UE) Radio Transmission and Reception; Release 11; Dec. 2012; 392 pages.
3GPP TS 36.104 V11.3.1; 3rd Generation Partnership Project; Technical Specification Group Radio Access Network; Evolved Universal Terrestrial Radio Access (E-UTRA); Base Station (BS) Radio Transmission and Reception; Release 11; Jan. 2013; 133 pages.
3GPP TS 36.212 V11.2.0; 3rd Generation Partnership Project; Technical Specification Group Radio Access Network; Evolved Universal Terrestrial Radio Access (E-UTRA); Multiplexing and Channel Coding; Release 11; Feb. 2013; 82 pages.
3GPP TS 36.213 V11.2.0; 3rd Generation Partnership Project; Technical Specification Group Radio Access Network; Evolved Universal Terrestrial Radio Access (E-UTRA); Physical Layer Procedures; Release 11; Feb. 2013; 173 pages.
3GPP TS 36.321 V11.1.0; 3rd Generation Partnership Project; Technical Specification Group Radio Access Network; Evolved Universal Terrestrial Radio Access (E-UTRA); Medium Access Control (MAC) Protocol Specification; Release 11; Dec. 2012; 57 pages.
3GPP TS 36.322 V11.0.0; 3rd Generation Partnership Project; Technical Specification Group Radio Access Network; Evolved Universal Terrestrial Radio Access (E-UTRA); Radio Link Control (RLC) Protocol Specification; Release 11; Sep. 2012; 39 pages.
3GPP TS 36.323 V11.1.0; 3rd Generation Partnership Project; Technical Specification Group Radio Access Network; Evolved Universal Terrestrial Radio Access (E-UTRA); Packet Data Convergence Protocol (PDCP) Specification; Release 11; Dec. 2012; 27 pages.
3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.
3GPP TR 36.816 V2.0.0; 3rd Generation Partnership Project; Technical Specification Group Radio Access Networks; Evolved Universal Terrestrial Radio Access (E-UTRA); Study on Signalling and Procedure for Interference Avoidance for In-Device Coexistence; Release 10; May 2011; 40 pages.
3GPP TSG-RAN WG4 Meeting #54; "Coexistence Studies Between LTE and WLAN"; R4-100706; San Francisco, US; Feb. 22-26, 2010; 7 pages.
3GPP TSG-RAN WG4 Meeting #54; "Addition of LTE UE RF Requirements for Coexistence with WLAN"; R4-100707; San Francisco, US; Feb. 22-26, 2010; 6 pages.
3GPP TSG-RAN-WG4 Meeting #55; "LS on In-Device Coexistence Interference"; R4-102268; Montreal, Canada; May 10-14, 2010; 1 page.
TSG RAN Meeting #56; "Core Part: Signalling and Procedure for Interference Avoidance for In-Device Coexistence"; RP-120508; Ljubljana, Slovenia; Jun. 13-15, 2012; 5 pages.

\* cited by examiner

TABLE 1

| LTE TDD (2.3-2.4 GHz, BAND 40) LTE UL (2.5-2.6 GHz, BAND 7) | ISM (2.4-2.4835 GHz) | COEXISTENCE |
|---|---|---|
| RECEPTION | TRANSMISSION | LTE: INTERFERED ISM: NORMAL |
| TRANSMISSION | RECEPTION | LTE: NORMAL ISM: INTERFERED |

TABLE 2

| LTE (777-787MHz/746-756MHz, BAND 13) (788-798MHz/758-768MHz, BAND 14) | GNSS (1575.42 MHz) | COEXISTENCE |
|---|---|---|
| TRANSMISSION | RECEPTION | LTE: NORMAL GNSS: INTERFERED |

TABLE 3

| RF MEASUREMENTS | | | | | | | | | |
|---|---|---|---|---|---|---|---|---|---|
| LTE RB | 1 | 10 | 25 | 50 | 100 | | | | |
| LTE Pout (dBm) | 23 | 20 | 17 | 14 | 11 | 8 | 5 | 2 | 0 |
| LTE EARFCN | 20850 | | | | | | | | |
| LTE tx active | CONTINUOUS | | | | | | | | |
| WLAN MCS | 1 | 7 | | | | | | | |
| WLAN CH | 1 | 6 | 7 | 8 | 9 | 10 | 11 | 12 | 13 |
| ANTENNA ISOLATION (dB) | 12 | | | | | | | | |

TABLE 4

| CONTENTS | BITS | UNIT |
|---|---|---|
| # OF RBs | A BITS | N/A |
| START INDEX OF RB | B BITS | N/A |
| STOP INDEX OF RB | C BITS | N/A |
| LTE Pout | D BITS | dBm |
| WLAN RX DE-SENSE | E BITS | dB |

RESOURCE BLOCK INDICATION AND ALLOCATION FOR IN-DEVICE COEXISTENCE INTERFERENCE AVOIDANCE

FIELD OF THE DISCLOSURE

The present disclosure relates to interference avoidance in devices with co-located radio technologies.

BACKGROUND

As used herein, the term "user equipment" (alternatively "UE") might refer to mobile devices such as mobile telephones, personal digital assistants, handheld or laptop computers, and similar devices that have telecommunications capabilities. Also, terms such as "user equipment," "UE," "user device," "mobile device," and "terminal" may be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or a network element.

LTE may be said to correspond to Third Generation Partnership Project (3GPP) Release 8 (Rel-8), Release 9 (Rel-9), and Release 10 (Rel-10), and possibly also to releases beyond Release 10, while LTE Advanced (LTE-A) may be said to correspond to Release 10, Release 11 (Rel-11), and possibly also to releases beyond Release 10 and Release 11.

A UE may include a wireless communication receiving component, transmitting component, and associated processing components that together allow the UE to communicate in accordance with the LTE standards. Such a set of components may be referred to herein as an LTE device or an LTE radio.

A UE may also include one or more additional sets of transmitting and/or receiving components that are co-located on the UE with the LTE device and that perform functions other than LTE-based communication. For example, such additional sets of components may be used for the transmission of energy in the industrial, scientific, and medical (ISM) radio bands or for navigation and positioning functions in a global navigation satellite system (GNSS) or a global positioning system (GPS). These additional sets of components may also use radio technologies different from that used in LTE. For example, wireless local area network (WLAN), WiFi, Bluetooth, or some other type of wireless radio frequency communication technology may be used. The term "WLAN" may be applied herein to any such transmitting components, receiving components, and/or associated components or functions that are used for purposes other than LTE-based communication and that use a radio technology other than LTE radio technology, but it should be understood that such components are not necessarily WLAN components.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 contains tables related to embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When a UE supports multiple co-located radio technologies, such as LTE and ISM or LTE and GNSS, transmissions or receptions by one of the radio technologies may cause interference with transmissions or receptions by the other technology. Such in-device coexistence interference may cause performance degradation. Embodiments of the present disclosure provide resource block request and allocation procedures to avoid interference between an LTE device and another device co-located on the same UE as the LTE device.

Figure 1:
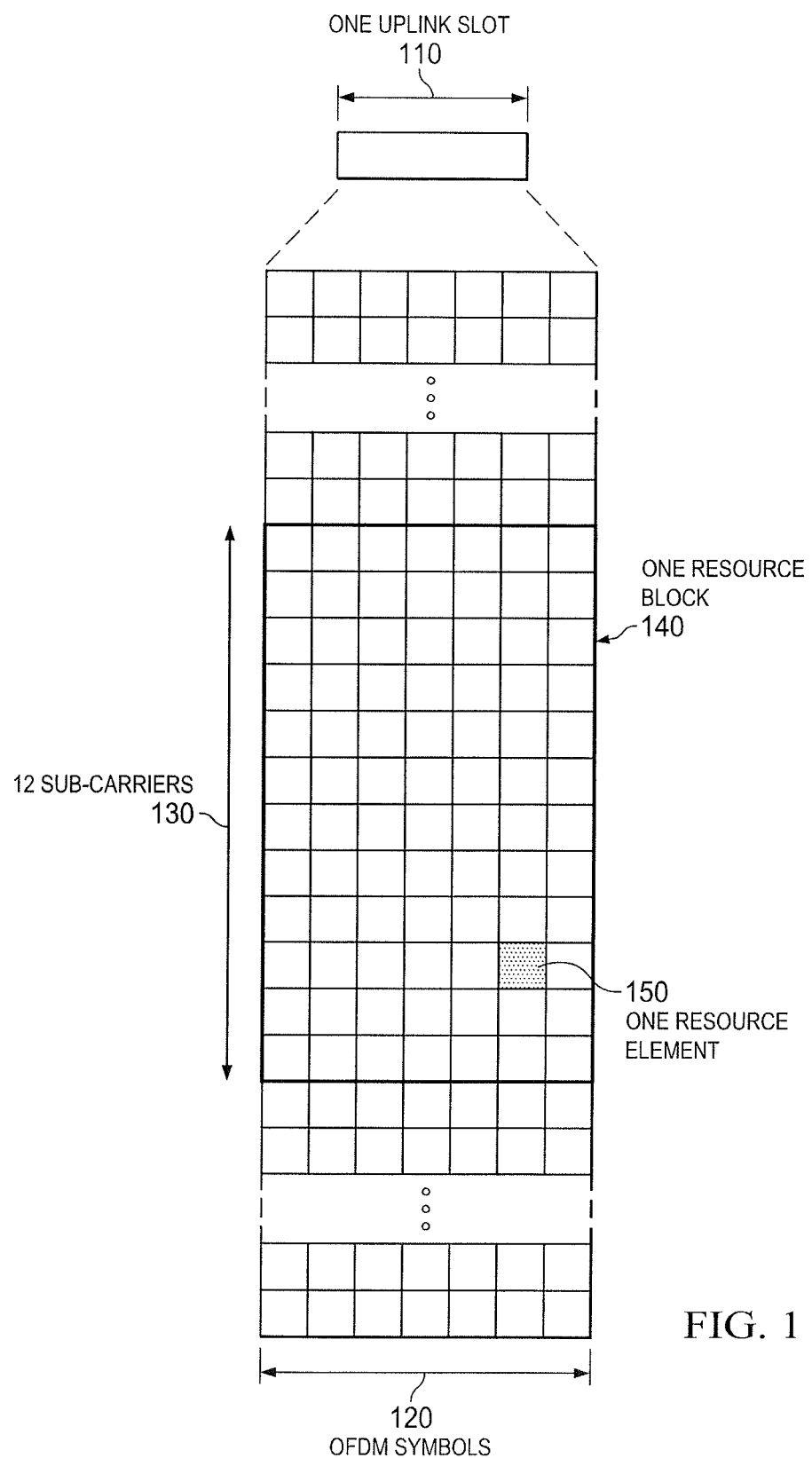
FIG. 1 is a diagram of an uplink resource block grid.

Transmission resources in LTE possess dimensions of time, frequency, and space. The spatial dimension, measured in "layers", is accessed by means of multiple "antenna ports" at the eNB. For each antenna port, a Reference Signal (RS) is provided to enable the UE to estimate the radio channel. The time-frequency resources for each transmit antenna port are subdivided in terms of frames and subframes, as shown in FIG. 1. The largest unit of time is the 10 millisecond (ms) radio frame, which is subdivided into ten 1 ms subframes, each of which is split into two 0.5 ms slots 110. Each slot 110 comprises seven orthogonal frequency division multiplexing (OFDM) symbols 120 in the case of a normal Cyclic Prefix (CP) length, or six if an extended CP is configured in the cell. In the frequency domain, resources are grouped in units of 12 subcarriers 130, thus occupying a total of 180 kilohertz (KHz) with a subcarrier spacing of 15 KHz. One unit of 12 subcarriers for a duration of one slot is termed a Resource Block (RB) 140. The smallest unit of resource is a Resource Element (RE) 150, which consists of one subcarrier for a duration of one OFDM symbol. An RB thus comprises 84 REs in the case of the normal cyclic prefix length, and 72 REs in the case of the extended cyclic prefix. Within certain RBs, some REs are reserved for special purposes such as synchronization signals, reference signals, control signaling, and broadcasting critical system information. The remaining REs are used for data transmission and are usually allocated in pairs of RBs, with the pairing occurring in the time domain.

Figure 2:
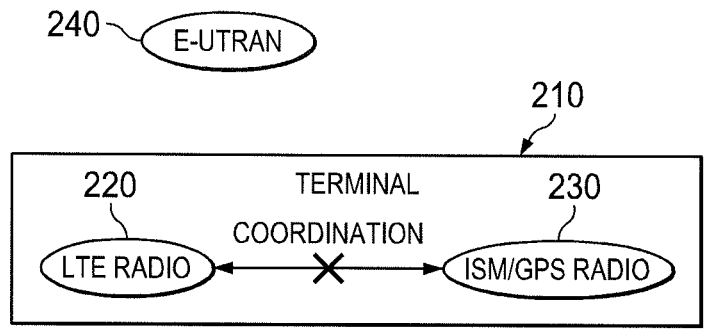
FIG. 2 is a diagram of a UE with co-located radio technologies in an uncoordinated mode.

Three operation modes are defined in 3GPP Technical Report (TR) 36.816. A first operation mode is an uncoordinated mode. In this mode, as illustrated in FIG. 2, different radio technologies within the same UE 210 operate independently without any internal coordination between each other. Because there is no internal coordination between the LTE device 220 and the WLAN device 230, interference detection and identification of the non-LTE component 230 (e.g., ISM, GPS, etc.) may be achieved at the LTE radio technology 220.

Figure 3:
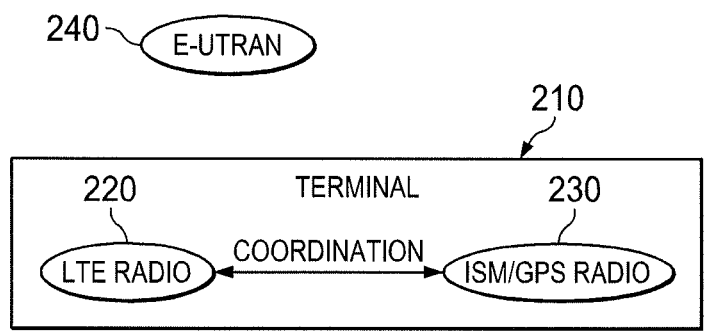
FIG. 3 is a diagram of a UE with co-located radio technologies with coordination only within the UE.

In a second operation mode, illustrated in FIG. 3, there is coordination only within the UE 210. That is, there is an internal coordination between the different radio technologies within the same UE 210, which means that the transmission and reception activities of one radio technology may be known by the other radio technology. However, the UE 210 may not notify the network 240 about the interference coexistence, and the network 240 may not be aware of the coexistence issues possibly experienced by the UE 210.

Figure 4:
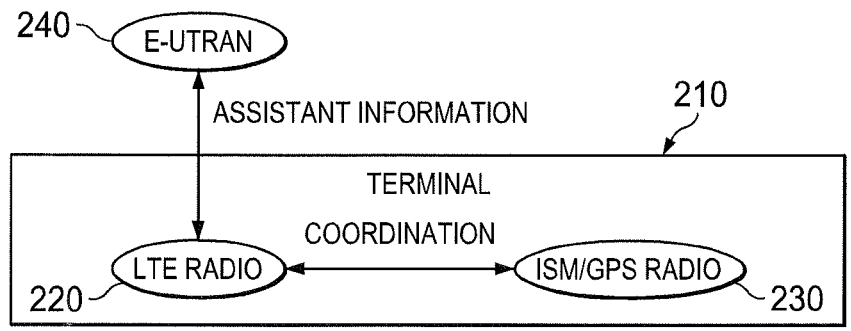
FIG. 4 is a diagram of a UE with co-located radio technologies with coordination at the network level.

In a third operation mode, illustrated in FIG. 4, there is coordination within the UE 210 and with the network 240. That is, different radio technologies within the UE 210 may be aware of possible interference coexistence problems, and the UE 210 may inform the network 240 about such problems. The network 240 may then decide how to avoid coexistence interference. The UE 210 may provide some assistance information to the network 240 so that the network 240 can provide a suitable solution for the UE 210.

As mentioned above, there may be coexistence issues between ISM technologies and LTE deployed in adjacent bands, especially interference to the LTE receiver caused by ISM transmission, as shown in Table 1 of FIG. 5. With current state-of-the-art filter technology, it may be impractical to rely on a filter to provide sufficient rejection of the adjacent channel interference. Hence, solutions other than simple, generic radio frequency (RF) design may be needed to solve the in-device coexistence interference problem for LTE and ISM.

As also mentioned above, there may be coexistence issues between GNSS technologies and LTE. As shown in Table 2 of FIG. 5, when LTE and GNSS components operate on the same device, there may be interference due to adjacent frequency band operation or harmonic frequencies, which cannot be avoided by the allocation of a guard band, at the sub-harmonic frequency. Hence, solutions other than simple, generic RF design may also be needed to solve the coexistence problem for the in-device coexistence interference between LTE and GNSS. It may be noted, however, that when these components are configured in a single UE, the interference may be limited to occasions when the LTE component is transmitting on the specified bands. That is, when the LTE and GNSS components are both receiving there may not be any interference.

If a UE detects interference to or from a WLAN device, the UE may send an in-device coexistence (IDC) indication message to the eNB and may include assistance information in the IDC indication message. For example, the unusable carriers may be explicitly listed. For LTE+Bluetooth (voice), one or more desired subframe reservation bitmap patterns that follow the hybrid automatic repeat request (HARQ) timing process may be included in the IDC indication message for a TDM solution. For other usage scenarios, the desired cycle periodicity/length and the active time or scheduling time for a discontinuous reception (DRX) configuration may be also included in the IDC indication message for a TDM solution. Such IDC assistance information may be transferred from a source eNB to a target eNB at an inter-eNB handover.

When the eNB receives an IDC indication message from the UE, the eNB may determine a solution for resolving the IDC interference based on the feedback information delivered in the IDC indication message from the UE. The solution may be a frequency division multiplexing (FDM)-based solution or a time division multiplexing (TDM)-based solution.

Figure 6:
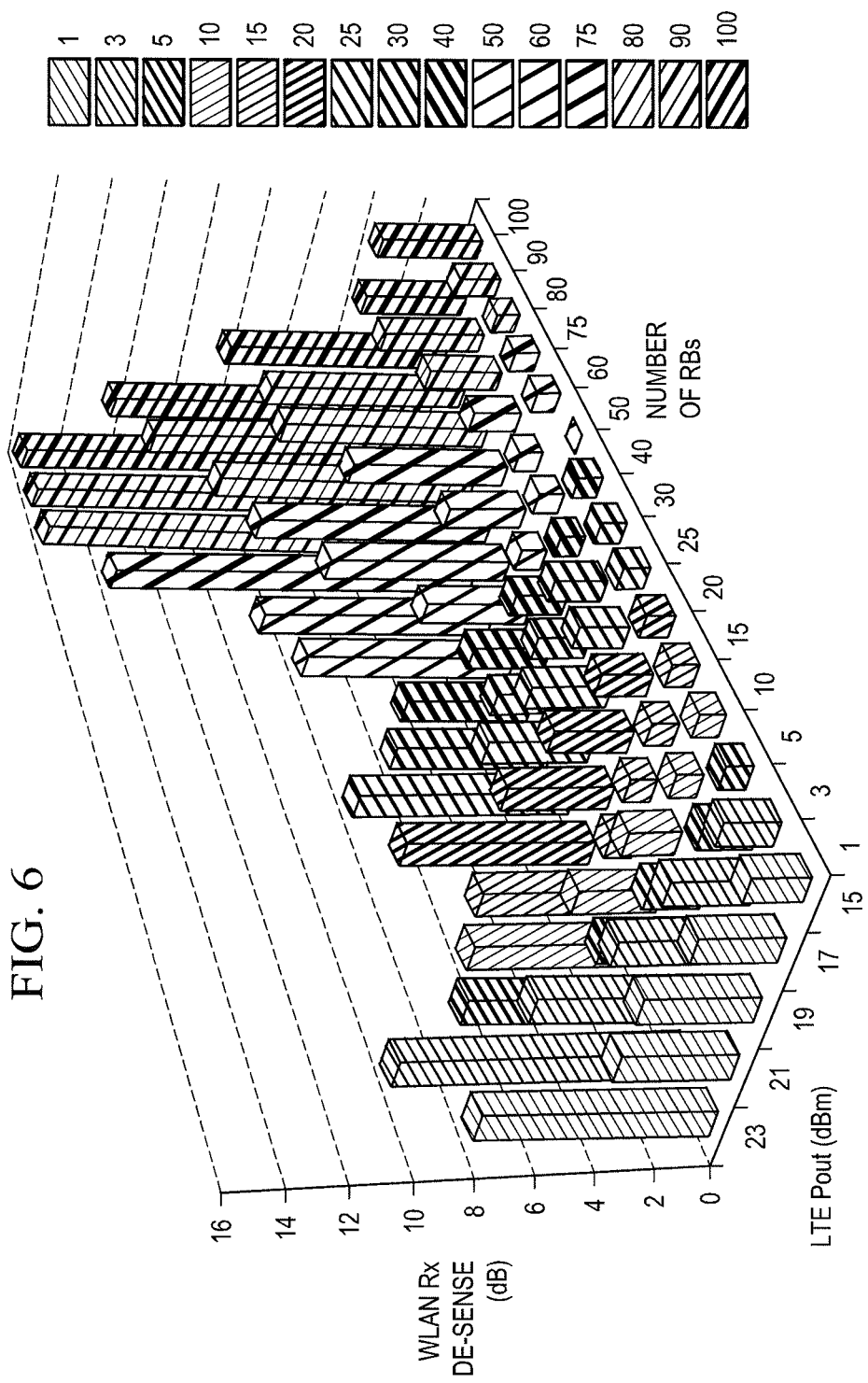
FIG. 6 is a diagram relating a number of LTE resource blocks to a WLAN reception de-sense value.

LTE transmission (Tx) in a band adjacent to a WLAN band may interfere with WLAN reception (Rx). This interference may manifest itself in the form of receiver de-sense, whereby the receiver sensitivity is decreased. In such a case, a stronger signal may be needed to correctly decode WLAN frames that may otherwise be correctly decoded with a weaker signal in the absence of the interference. The WLAN de-sense may be attributed to an LTE out-of-band (OOB) emission leaking into the WLAN channel and blocking attributed to the WLAN receiver reacting non-linearly to the LTE signal operating in an adjacent band. The actual amount of WLAN receiver de-sense caused by this interference is a function, among other factors, of the number of LTE RBs allocated by the eNB to the co-located LTE radio in the uplink (UL) direction. The interaction of this varying power spectral density (PSD) with other RF components on the WLAN radio may result in a non-monotonic WLAN de-sense, as shown in FIG. 6. It may be seen that a smaller number of RBs for an LTE transmission does not necessarily result in lower interference to the WLAN device.

For example, having a sub-frame with 15 RBs may cause 5 decibels (dB) of WLAN Rx de-sense as opposed to a sub-frame with 3 RBs, which may cause approximately 10 dB of WLAN Rx de-sense when the LTE transmission power is 23 dBm. This may be explained by noting that, for a fixed LTE output power (e.g., 23 dBm), the PSD for an LTE signal with a smaller number of RBs may be higher. This may result in a stronger blocking interference component affecting the WLAN receiver. Additionally, depending on the LTE power amplifier characteristics, the side lobes of the LTE signal falling into the ISM band may have higher total power than that which corresponds to a signal with a larger number of RBs.

The amount of WLAN de-sense experienced may depend on one or more of at least three factors. A first factor is the total band-limited interference power. As seen by the WLAN automatic gain control (AGC) circuitry, filter characteristics in the receiver may directly influence the amount of power seen. If the power is high enough, the AGC may back off the receiver gain, with a reduction in signal to interference-plus-noise ratio (SINR) as a result. A second factor is the total interference power passing through the base band channel filter. This interference power may directly reduce the energy-per-bit to spectral-noise-density ratio (Eb/No) seen by the demodulator. A third factor is the amount of intermodulation spur power, generated in the WLAN front end, falling inside the WLAN channel band width.

For narrowband LTE transmission (RB<10), the position of the transmitted RB cluster within the nominal 20 megahertz (MHz) LTE channel bandwidth may create an implementation-dependent output spectrum where one or more spurs or intermodulation products may appear. For a given number of RBs, the spectrum may be relatively clean-looking (i.e., with no or few spurs), whereas with a shift in the RB frequency location, multiple spurs may become visible. The RF frequency locations of the spurs, and hence the severity of the de-sense, may depend on RB start index (subcarrier number) as well as the particular hardware implementation. The frequency and amplitude of the spurs may then potentially cause WLAN de-sense according to the three factors discussed above.

Figure 7:
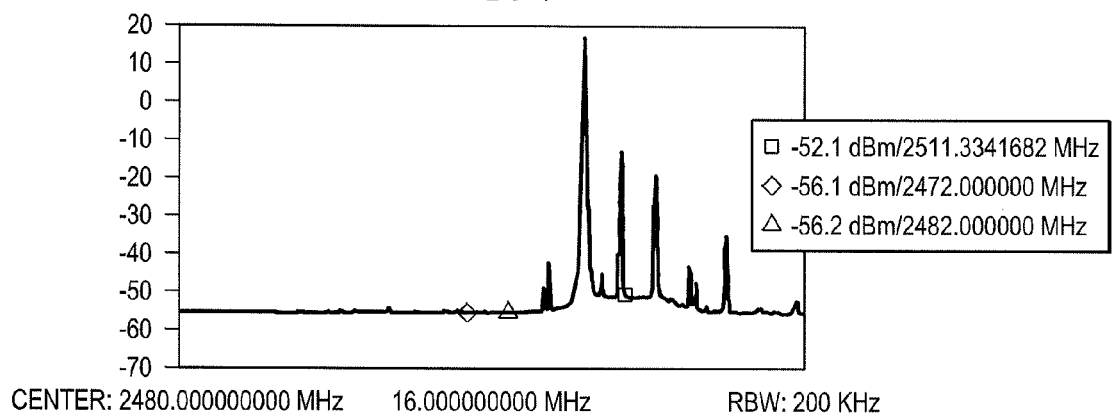
FIG. 7 is a diagram of an LTE uplink spectrum with one resource block and start index 0, according to an embodiment of the disclosure.
Figure 8:
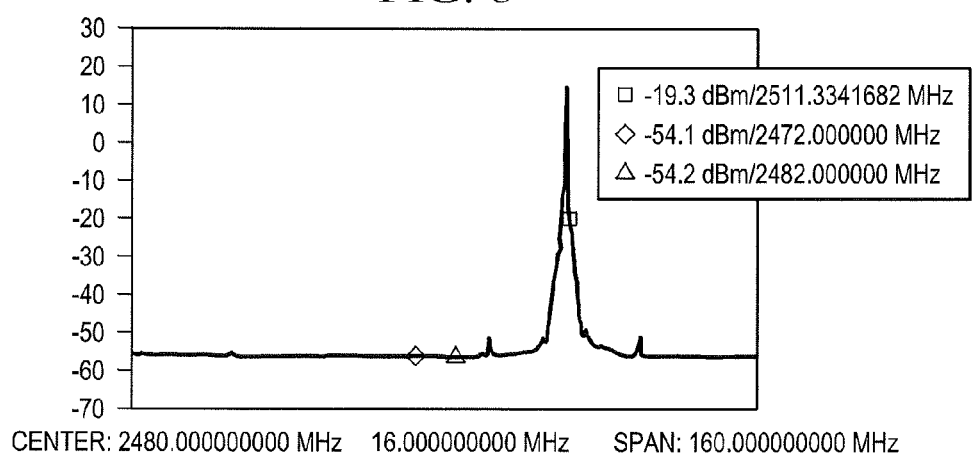
FIG. 8 is a diagram of an LTE uplink spectrum with one resource block and start index 49, according to an embodiment of the disclosure.

Referring to FIG. 7, it may be seen that the output spectrum consists of a large number of modulated spurs where the dominant spur is the desired LTE signal. The spur just to its right is the Tx local oscillator leakage. The next spur to the right is the unwanted upper sideband. The remaining spurs are intermodulation products of these three spurs. Although not seen on the plot due to the limited dynamic range, the intermodulation spurs extend in frequency above and below the visible spurs on the plot. In particular, the spur close to marker 1 may fall in the center of WLAN channel 13. As it cannot be filtered by the WLAN front end, it may directly affect the sensitivity of the WLAN receiver. On the other hand, if the RB index is such that the LTE RB allocation is centered in or close to the LTE channel, as in FIG. 8, then any UE transmitter that is based on Direct up Conversion Architecture may see a transmit spectrum with greatly reduced spectral bandwidth (in terms of unwanted spurs). This is exemplified by FIG. 8, where the unwanted spurs largely overlap the main transmitted signal. The resulting on-channel distortion, as dictated per RF system design, may still have to be within acceptable limits. A considerable improvement may be expected in the WLAN de-sense compared to the case resulting in the spectrum depicted in FIG. 7.

Figure 9:
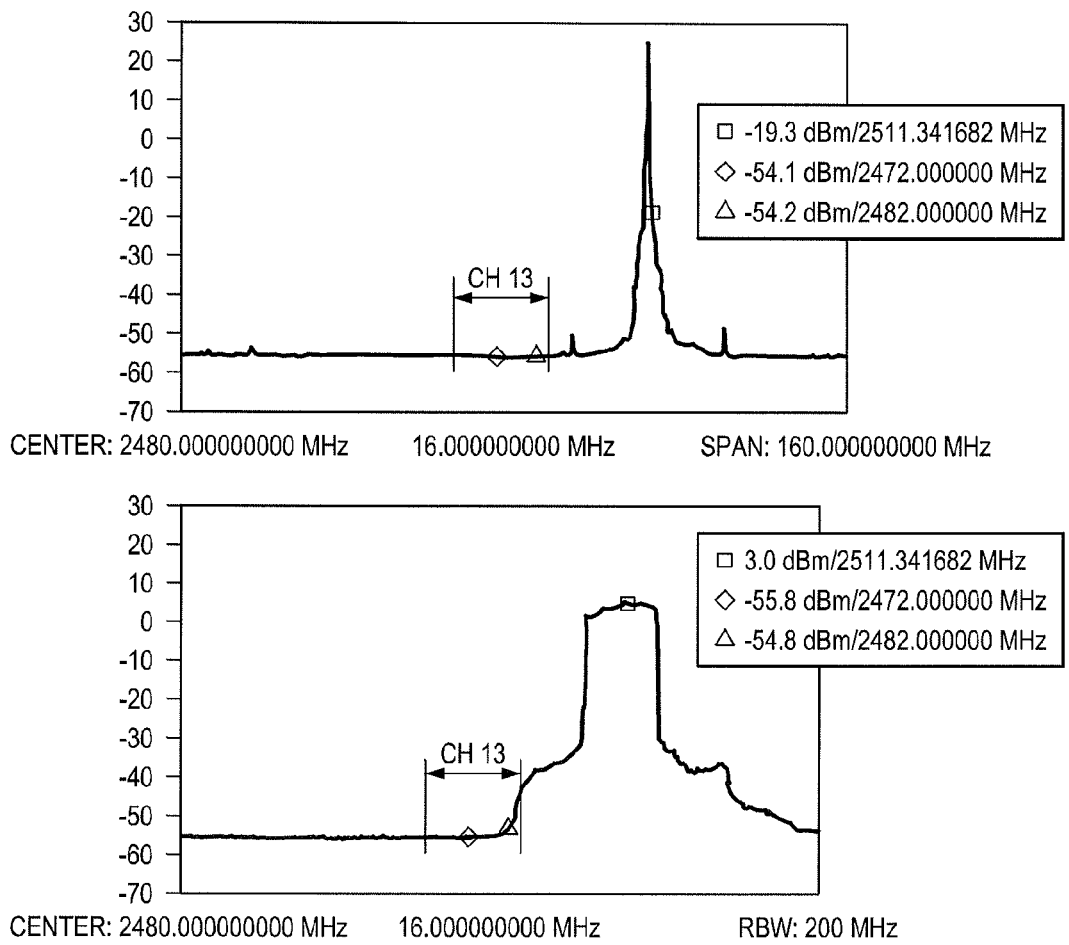
FIG. 9 is a diagram of an LTE uplink spectrum for resource block sizes 1 and 100, according to an embodiment of the disclosure.

When the number of RBs becomes large, as shown in FIG. 9, the spectral regrowth of the LTE Tx spectrum may cause the transmitted signal energy to spread, which may then appear as in-band noise-like interference into the upper WLAN channels. Little may be done about this type of interference for a given UE architecture other than lowering the LTE total Tx power, which may not be possible as the LTE total Tx power is dictated by the eNB.

For an intermediate value of RB size, the spectral density and frequency characteristics of the unwanted LTE emissions may vary and may thus affect the WLAN de-sense to a varying degree. The exact impact may be difficult to analytically predict as it is of statistical nature and further depends on parameters such WLAN coding and modulation, the nature of the interference, and whether it affects WLAN pilot tones or data carrying sub-carriers.

Figure 10:
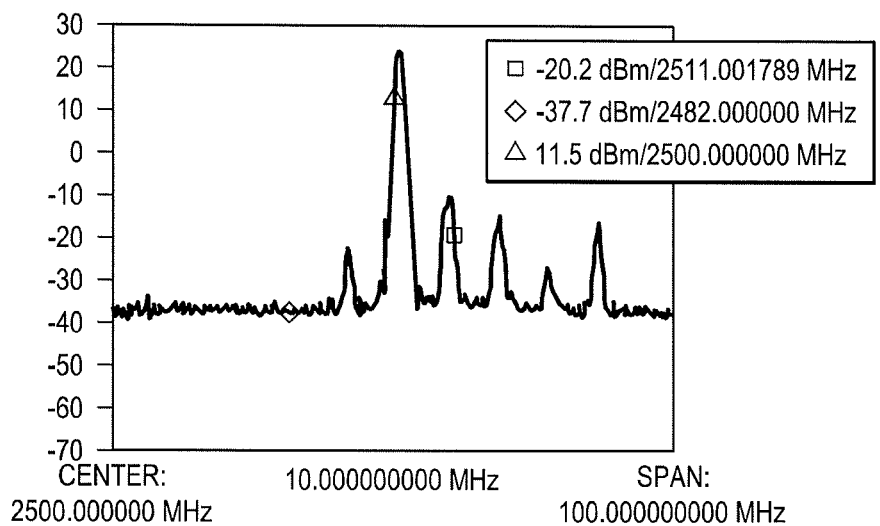
FIG. 10 is a diagram of a spectrum for a one resource block LTE signal at 23 dBm, according to an embodiment of the disclosure.
Figure 11:
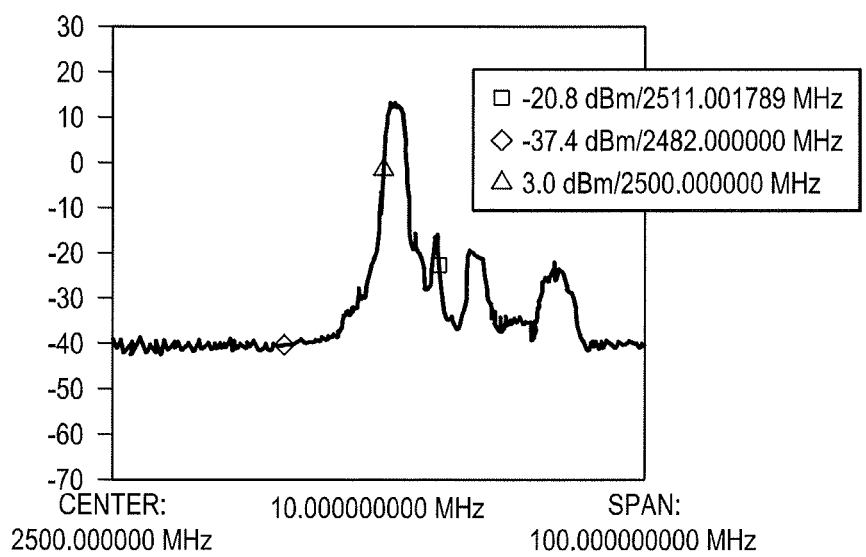
FIG. 11 is a diagram of a spectrum for a ten resource block LTE signal at 23 dBm, according to an embodiment of the disclosure.

FIG. 10 and FIG. 11 show examples of output signals of an LTE power amplifier configured with 1 and 10 RBs, respectively, at 23 dBm output power. It may be observed that the maximum PSD of the lower-side side lobes of the 1 RB signal is greater than that of the 10 RB signal. The side lobe powers may be equal, but the spectral widths and PSD may vary, as the side lobe for the case of 10 RBs is "smeared out" in frequency compared to the 1 RB case. The main lobe (marker 2) and the left side spur may cause a third order intermodulation distortion product to appear just inside the WLAN channel 13 (marker 1). A similar distortion product is not as prominent for the 10 RB case.

Although somewhat dictated by the particular scheduling and UL power control scheme implemented by the eNB, it may be generally assumed that the overall power transmitted by the UE is a function of the number of RBs allocated to the UE. In particular, for a UE with a given channel condition and pathloss experiencing WLAN de-sense due to concurrent LTE UL transmission, it may be advantageous to transmit with a particular, reduced number of RBs and to place the transmitted RB cluster close to the center of the LTE channel.

Figure 12:
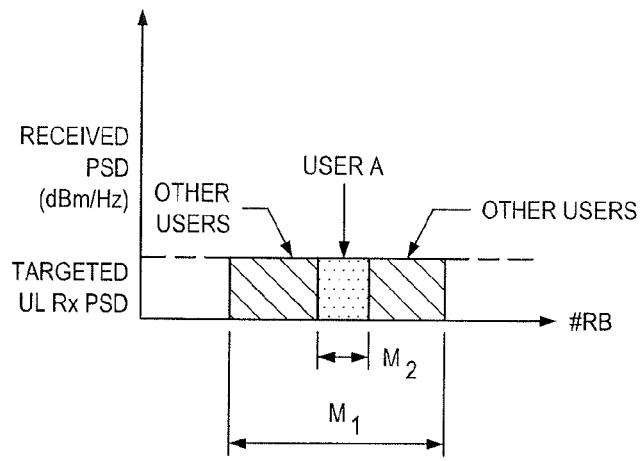
FIG. 12 is a diagram of a received power spectral density from multiple UEs, according to an embodiment of the disclosure.

In general, it may be preferred that the UL transmissions from one or more UEs, sharing the same LTE channel, be received at the eNB with approximately similar PSD. This is illustrated in FIG. 12, where a particular user (A) occupying only a fraction of the total number of RBs available in the LTE channel is received at the same PSD level as the other users sharing the LTE channel bandwidth.

For a particular UE, this means that, at any given time, the required transmit power per RB may be dictated by, among other parameters, the UL pathloss, which the UE estimates based on the DL pathloss that the UE calculates. Thus the total power ($P_{tx}$) transmitted by the UE is proportional to the number of RBs:

$$P_{tx} \approx P_0 + 10 * \log_{10}(M)(\text{dBm}) \qquad \text{Eq. 1}$$

where $P_0$ is the required transmit power per RB expressed in dBm and M is the number of RBs. Power may further be bounded by regulatory or implementation limits, among other factors.

As mentioned above, the amount of WLAN de-sense may depend on the total transmitted power, all other thing being equal. A reduction in transmit power may lead to a reduction of the broadband noise emitted by the LTE transmitter and may also decrease the amount of intermodulation generated both in the LTE circuitry and the WLAN circuitry.

Embodiments of the present disclosure provide methods for specifying RBs having less interference to a WLAN device from a co-located LTE device. Additionally, signaling procedures for requests and allocations, including the behavior of the eNB and the UE, are also provided.

In an embodiment, when an LTE device within a UE is enabled, the UE identifies specific RBs that may lessen the interference to a co-located WLAN device and then sends an IDC indication message including this RB information to the eNB. When the eNB receives the RB information, the eNB may allocate to the UE specific RBs for LTE UL transmission. These embodiments provide RB information that can be useful for IDC interference avoidance and provide a way to reduce interference from the LTE device to the WLAN device. The embodiments also provide a way to specify RBs having less interference to the WLAN device. The embodiments further provide signaling procedures to send RB-related information to the eNB. A UL signaling message to send the RB information is also provided. In addition, the embodiments provide a way to send RB-related information to a target eNB from a serving eNB when the UE is undergoing a handover.

Figure 13:
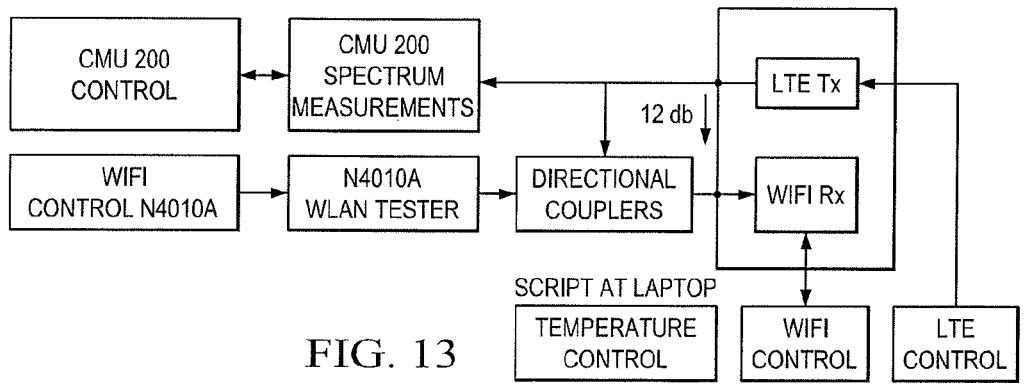
FIG. 13 illustrates a de-sense measurement procedure, according to an embodiment of the disclosure.

Table 3 in FIG. 5 shows the parameters relevant to the WLAN de-sense chart shown in FIG. 6. Based on the permutation of these parameters, actual measurements of the WLAN de-sense may be performed by using, for example, the components shown in FIG. 13.

That is, a UE manufacturer may perform testing to determine the amount of de-sense that occurs for various values of the number of RBs and the LTE output power and may thereby derive a chart similar to that in FIG. 6. Such a chart may be approximately the same for all UEs of a particular model, and the information contained in such a chart may be stored in and available for retrieval by a UE.

In an embodiment, when a UE detects IDC interference, the UE may consult the information contained in a chart such as that in FIG. 6 to determine a number of RBs and a location of RBs on which the UE may communicate on the uplink in order to reduce interference to a co-located WLAN device. The UE may then send an IDC indication message to the eNB requesting that the UE be allowed to use this number and location of RBs for UL communication. The eNB may then allocate the requested number of RBs at the requested location. If the UE then uses those RBs for uplink communication, IDC interference to the WLAN device may be reduced.

Therefore, in an embodiment, one or more of the following items of information may be delivered from a UE to an eNB in an IDC indication message: a number of resource blocks, a start index for a resource block, a stop index for a resource block, an LTE output power, and/or a WLAN de-sense at the given power and number of RBs. That is, information regarding which RBs are requested may be specified in at least three different ways. The requested RBs may be identified by a start index and a stop index for a set of RBs, by a start index and a size of a set of RBs, or by a stop index and a size of a set of RBs.

Therefore, there are at least three options for the information the UE may send in an IDC indication message to indicate an IDC interference problem to the eNB and to request a preferred set of RBs for an LTE UL transmission that will cause less interference to the WLAN device. In a first option, the UE sends a preferred RB allocation size for the LTE UL transmission, a preferred start index of the RB for the LTE UL transmission, the LTE output power (Pout), and the WLAN Rx de-sense experienced. In a second option, the UE sends a preferred start index of the RB for the LTE UL transmission, a preferred stop index of the RB for the LTE UL transmission, the LTE Pout, and the WLAN Rx de-sense experienced. In a third option, the UE sends a preferred RB allocation size for the LTE UL transmission, a preferred stop index of the RB for the LTE UL transmission, the LTE Pout, and the WLAN Rx de-sense experienced.

It may be seen that, in all three options, the UE includes in the IDC indication message the LTE output power, the WLAN reception de-sense, and information regarding which RBs are requested for a UL transmission. The information regarding which RBs are requested for the UL transmission may be specified by the start index and stop index for the set of RBs, the start index and size of the set of RBs, or the stop index and size of the set of RBs.

The UE may send such information to the eNB in a new radio resource control (RRC) message, in an existing RRC message with a new information element (IE), in a new medium access control (MAC) control element (CE), in a reserved field in an existing MAC CE, or in an IDC indication message. Such information reported from the UE may be used by the eNB when the eNB schedules LTE UL traffic for the UE.

Alternatively, based on the maximum tolerable WLAN Rx de-sense threshold, only those RB densities which cause de-sense below the threshold may be reported for the different LTE Pout levels. This information related to the threshold may be sent to the eNB using any of the RRC, MAC, or IDC message options described above. The threshold value for this operation may be provided to the UE by the eNB using any of the RRC, MAC, or IDC message options described below. Table 4 in FIG. 5 shows an example of information that may be included in the RRC, MAC, or IDC message options described above. In the case of an existing RRC message with a new IE, the information in Table 4 may be embedded as one or more information elements. In the case of a MAC CE, the information in Table 4 may be embedded in the MAC payload as part of a MAC subframe.

In Table 4, the number of bits for RB information may be adjusted according to the message length and system capability. Also, an amount of bit information may be defined based on the accuracy of the reported RB information. For example, if the UE reports more detailed RB information, bit information may be larger for showing detail granularities.

Figure 14:
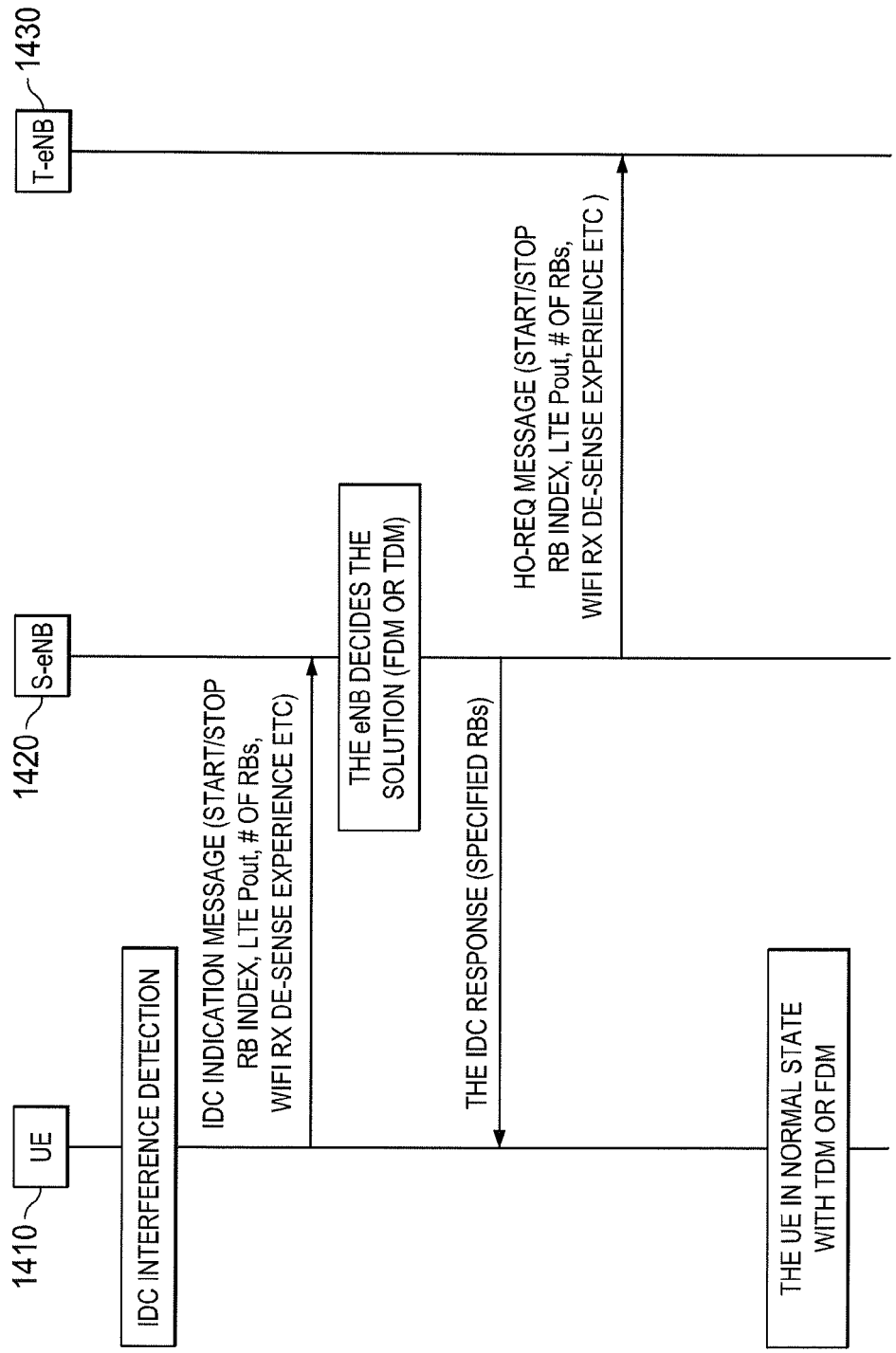
FIG. 14 illustrates resource block-related information transmission for the UE/eNB and serving eNB/target eNB interface, according to an embodiment of the disclosure.

FIG. 14 shows an embodiment of a signaling procedure for RB-related information delivery to the eNB using an IDC indication message and X2 interface message. The RB-related information may be delivered as assistance information in the IDC indication message. In the case of a handover of a UE 1410, a serving eNB (S-eNB) 1420 may transfer this RB information to a target eNB (T-eNB) 1430. Therefore, RB information (e.g., the LTE Pout, the number of RBs, and the WLAN Rx de-sense experienced at the specified LTE Pout and number of RBs) may be transmitted on the X2 interface, which is the inter-eNB interface, using, for example, a HO-REQ message.

If the UE sends RB-related information to the eNB for the LTE UL transmission, the eNB may allocate, based on the eNB's scheduling and load balancing status, an appropriate number of RBs that cause less interference to the WLAN device. In order to maintain LTE UL data throughput, the LTE UL transmission rate may need to be increased when the number of RBs allocated to UE is decreased. One way of achieving this may be for the eNB to grant the UE more frequent transmission events, as the eNB may be aware of the ongoing WLAN de-sense due to the fact that the number of RBs requested by the UE is less than maximum number available in the LTE UL channel. Another approach may be for the UE to send UL scheduling requests more frequently when using an allocation with a smaller number of RBs, rather than buffering data with the hope of being granted a large RB allocation at a lower duty cycle. Accordingly, when the eNB receives RB information from the UE, the eNB may use that information for RB scheduling and allocate RBs to the UE in order to reduce interference to the WLAN device when the LTE device is enabled. The eNB may send the RB allocation to the UE in a new RRC message, in an existing RRC message with a new IE, in a new MAC CE, in a reserved field in an existing MAC CE, or in an IDC indication response message.

Figure 15:
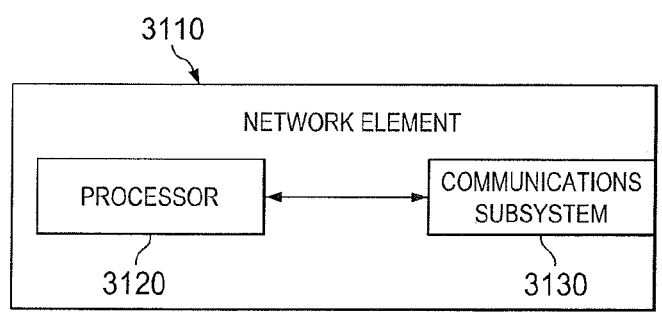
FIG. 15 is a simplified block diagram of an exemplary network element according to one embodiment.

The above may be implemented by a network element. A simplified network element is shown with regard to FIG. 15. In the figure, network element 3110 includes a processor 3120 and a communications subsystem 3130, where the processor 3120 and communications subsystem 3130 cooperate to perform the methods described above.

Figure 16:
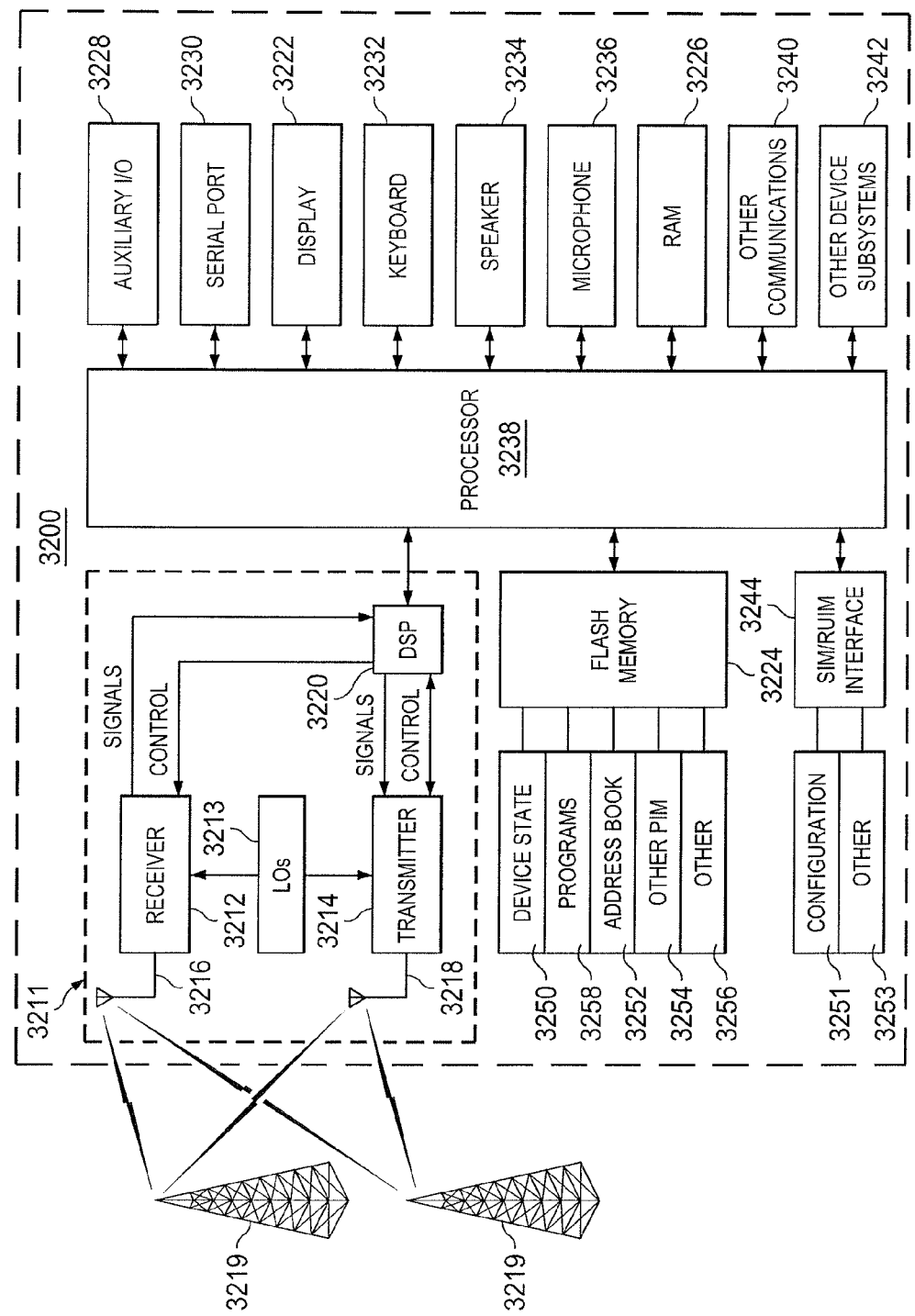
FIG. 16 is a block diagram with an example user equipment capable of being used with the systems and methods in the embodiments described herein.

Further, the above may be implemented by a UE. One exemplary device is described below with regard to FIG. 16. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate one or more communication subsystems 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate. In some cases, a first communication subsystem 3211 may be an LTE device as described herein and a second communication subsystem 3211 may be a WLAN device as described herein.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in the figure, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 17:
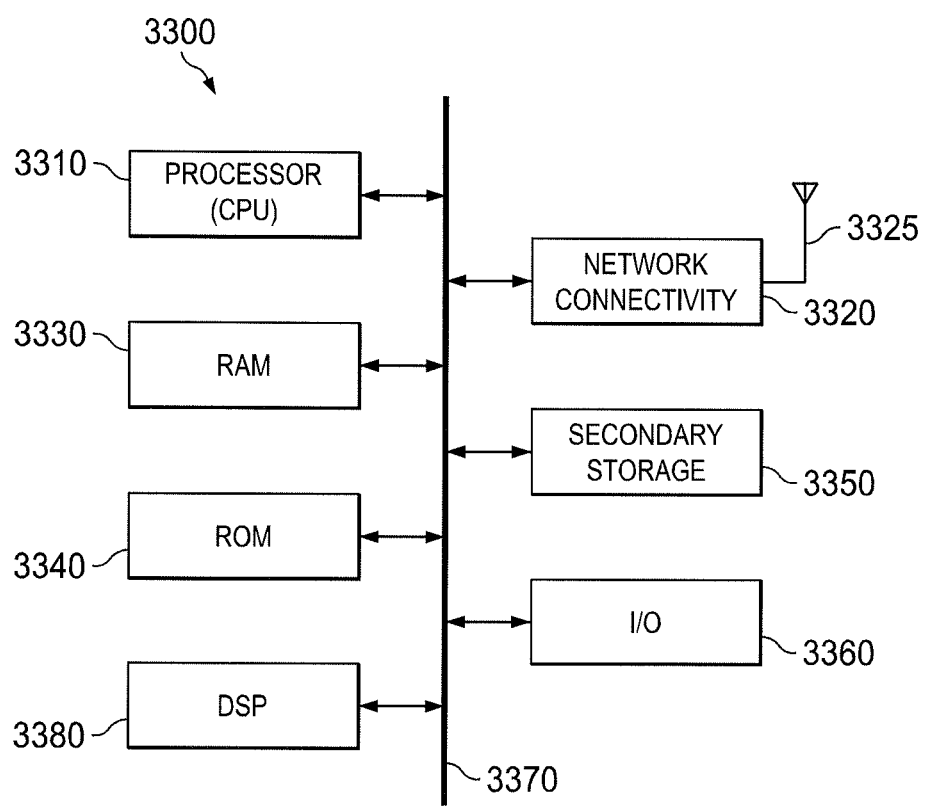
FIG. 17 illustrates a processor and related components suitable for implementing the several embodiments of the present disclosure.

The UE and other components described above might include a processing component that is capable of executing instructions related to the actions described above. FIG. 17 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method is provided for reducing radio frequency interference between a first device and a second device co-located on a UE. The method comprises transmitting, by the UE, to a network element, responsive to the UE detecting IDC interference between the first device and the second device, an output power level of the first device, an amount of de-sense experienced by the second device, and information regarding a plurality of RBs on which the UE requests to perform an uplink transmission.

In another embodiment, a UE is provided. The UE comprises a processor configured such that the UE transmits, to a network element, responsive to the UE detecting IDC interference between a first device and a second device co-located on the UE, an output power level of the first device, an amount of de-sense experienced by the second device, and information regarding a plurality of RBs on which the UE requests to perform an uplink transmission.

In another embodiment, a network element is provided. The network element comprises a processor configured such that, responsive to receiving from a UE an output power level of a first device on the UE, an amount of de-sense experienced by a second device on the UE, and information regarding a plurality of RBs requested by the UE for uplink transmission, the network element grants at least a portion of the requested RBs to the UE.

The following are incorporated herein by reference for all purposes: 3GPP Technical Specification (TS) 36.101, 3GPP TS 36.104, 3GPP TS 36.212, 3GPP TS 36.213, 3GPP TS 36.321, 3GPP TS 36.322, 3GPP TS 36.323, 3GPP TS 36.331, and 3GPP TR 36.816.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for reducing radio frequency interference between a first device and a second device co-located on a user equipment (UE), the method comprising:
   transmitting, by the UE, to a network element, responsive to the UE detecting in-device coexistence (IDC) interference between the first device and the second device, an output power level of the first device, an amount of de-sense experienced by the second device, and information regarding a plurality of resource blocks (RBs) on which the UE requests to perform an uplink transmission,
   wherein the information regarding the plurality of RBs comprises one of:
   a start index and a stop index for the plurality of RBs;
   a start index and a number of RBs for the plurality of RBs; or
   a stop index and a number of RBs for the plurality of RBs; and wherein, when a decrease occurs in the number of RBs on which the UE transmits in the uplink responsive to the UE's transmission of the output power level of the first device, the amount of de-sense experienced by the second device, and the information regarding the plurality of RBs, an increase occurs in the UE's uplink transmission rate, the increase being achieved by an increase in the number of scheduling requests made by the UE.

2. The method of claim 1, wherein the first device is a long term evolution (LTE)-based device and the second device is one of:
   a device using an industrial, scientific, and medical (ISM) radio frequency band; or
   a device using a global navigation satellite system (GNSS) radio frequency band.

3. The method of claim 2, wherein the information regarding the plurality of RBs comprises specific RBs determined by the UE in order to reduce the amount of de-sense experienced by the second device while the LTE-based device performs the uplink transmission at the output power level.

4. The method of claim 1, wherein the UE retrieves from internal storage for inclusion in the transmission to the network element data relating a number of RBs for uplink transmission to the output power level of the first device and to the amount of de-sense experienced by the second device.

5. The method of claim 1, wherein the UE transmits the output power level of the first device, the amount of de-sense experienced by the second device, and the information regarding the plurality of RBs in at least one of:
   a new radio resource control (RRC) message;
   an existing RRC message with a new information element;
   a new medium access control (MAC) control element (CE);
   a reserved field in an existing field in a MAC CE; or
   an IDC indication message.

6. The method of claim 1, wherein the UE includes in the transmission to the network element only RB densities that cause in the second device a de-sense level below a threshold level, information regarding the threshold level having been received by the UE from the network element.

7. The method of claim 1, wherein the UE further includes in the transmission to the network element at least one of:
   unusable carriers;
   one or more desired subframe reservation bitmap patterns that follow a hybrid automatic repeat request (HARQ) timing process; or
   a desired cycle periodicity or length for a discontinuous reception (DRX) configuration.

8. A user equipment (UE) comprising:
   a processor configured such that the UE transmits, to a network element, responsive to the UE detecting in-device coexistence (IDC) interference between a first device and a second device co-located on the UE, an output power level of the first device, an amount of de-sense experienced by the second device, and information regarding a plurality of resource blocks (RBs) on which the UE requests to perform an uplink transmission,
   wherein the information regarding the plurality of RBs comprises one of:
   a start index and a stop index for the plurality of RBs;
   a start index and a number of RBs for the plurality of RBs; or
   a stop index and a number of RBs for the plurality of RBs; and wherein, when a decrease occurs in the number of RBs on which the UE transmits in the uplink responsive to the UE's transmission of the output power level of the first device, the amount of de-sense experienced by the second device, and the information regarding the plurality of RBs, an increase occurs in the UE's uplink transmission rate, the increase being achieved by an increase in the number of scheduling requests made by the UE.

9. The UE of claim 8, wherein the first device is a long term evolution (LTE)-based device and the second device is one of:
   a device using an industrial, scientific, and medical (ISM) radio frequency band; or
   a device using a global navigation satellite system (GNSS) radio frequency band.

10. The UE of claim 9, wherein the information regarding the plurality of RBs comprises specific RBs determined by the UE in order to reduce the amount of de-sense experienced by the second device while the LTE-based device performs the uplink transmission at the output power level.

11. The UE of claim 8, wherein the UE retrieves from internal storage for inclusion in the transmission to the network element data relating a number of RBs for uplink transmission to the output power level of the first device and to the amount of de-sense experienced by the second device.

12. The UE of claim 8, wherein the UE transmits the output power level of the first device, the amount of de-sense experienced by the second device, and the information regarding the plurality of RBs in at least one of:
   a new radio resource control (RRC) message;
   an existing RRC message with a new information element;
   a new medium access control (MAC) control element (CE);
   a reserved field in an existing field in a MAC CE; or
   an IDC indication message.

13. The UE of claim 8, wherein the UE includes in the transmission to the network element only RB densities that cause in the second device a de-sense level below a threshold level, information regarding the threshold level having been received by the UE from the network element.

14. A network element comprising:
   a processor configured such that, responsive to receiving from a user equipment (UE) an output power level of a first device on the UE, an amount of de-sense experienced by a second device on the UE, and information regarding a plurality of resource blocks (RBs) requested by the UE for uplink transmission, the network element grants at least a portion of the requested RBs to the UE; wherein the information regarding the plurality of RBs comprises one of: a start index and a stop index for the plurality of RBs; a start index and a number of RBs for the plurality of RBs; or a stop index and a number of RBs for the plurality of RBs; and wherein, when the network element decreases the number of RBs granted to the UE responsive to receiving the output power level of the first device, the amount of de-sense experienced by the second device, and the information regarding plurality of RBs requested by the UE, the network element increases the number of uplink grants to the UE in order to increase the UE's uplink transmission rate.

15. The network element of claim 14, wherein the network element determines size of the grant of RBs based on the network element's scheduling and load balancing status, and wherein the network element provides the grant of RBs to the UE in at least one of:
   a new radio resource control (RRC) message;
   an existing RRC message with a new information element;
   a new medium access control (MAC) control element (CE);
   a reserved field in an existing field in a MAC CE; or
   an IDC indication response message.

16. The network element of claim 14, wherein the network element transmits to the UE a threshold level indicating that the UE is to transmit to the network element only RB densities that cause in the second device a de-sense level below the threshold level.

17. The network element of claim 14, wherein the network element transmits the output power level of the first device, the amount of de-sense experienced by the second device, and the information regarding a plurality of RBs requested by the UE to another network element responsive to a handover request from the UE.

* * * * *